US012340998B2

(12) United States Patent
Glish et al.

(10) Patent No.: US 12,340,998 B2
(45) Date of Patent: Jun. 24, 2025

(54) CONDENSED LIQUID AEROSOL PARTICLE SPRAY (CLAPS)—A NOVEL ON-LINE LIQUID AEROSOL SAMPLING AND IONIZATION TECHNIQUE

(71) Applicant: The University of North Carolina at Chapel Hill, Chapel Hill, NC (US)

(72) Inventors: Gary L. Glish, Chapel Hill, NC (US); Nathaneal A. Park, Chapel Hill, NC (US); Kenneth D. Swanson, Dunwoody, GA (US)

(73) Assignee: The University of North Carolina at Chapel Hill, Chapel Hill, NC (US)

( * ) Notice: Subject to any disclaimer, the term of this patent is extended or adjusted under 35 U.S.C. 154(b) by 455 days.

(21) Appl. No.: 18/070,824

(22) Filed: Nov. 29, 2022

(65) Prior Publication Data

US 2023/0162966 A1 May 25, 2023

Related U.S. Application Data

(63) Continuation of application No. PCT/US2021/034915, filed on May 28, 2021.

(Continued)

(51) Int. Cl.

*H01J 49/00* (2006.01)
*H01J 49/04* (2006.01)
*H01J 49/16* (2006.01)

(52) U.S. Cl.

CPC ........ *H01J 49/167* (2013.01); *H01J 49/0422* (2013.01)

(58) Field of Classification Search

CPC ... H01J 49/167; H01J 49/0422; H01J 49/0445

(Continued)

(56) References Cited

U.S. PATENT DOCUMENTS 5,868,322 A 2/1999 Loucks, Jr. et al.
2002/0125423 A1 9/2002 Ebeling et al.

(Continued)

FOREIGN PATENT DOCUMENTS

KR 2012-0032599 A 4/2012

OTHER PUBLICATIONS

International Search Report and Written Opinion for Application PCT/US2021/034915 dated Sep. 17, 2021.

*Primary Examiner* — Michael Maskell
(74) *Attorney, Agent, or Firm* — KDW FIRM PLLC

(57) ABSTRACT

Systems and methods for ionizing analytes in a sample use an atomizer that generates aerosol particles containing the sample analytes and an emitter having inner and outer capillaries. The outer capillary is arranged about (e.g., concentrically about) the inner capillary, forms an orifice of the emitter, and receives the aerosol from the atomizer. The aerosol particles condense against the inner surface of the outer capillary and/or the outer surface of the inner capillary and form a reservoir of condensate liquid sample at the orifice of the emitter. The emitter receives, within the inner capillary, a nebulizing gas that flows towards the terminal end of the inner capillary. An electrical potential is applied between the emitter and an inlet of a sample analyzer. The nebulizing gas, the supply pressure of the aerosol to the outer capillary, and the electrical potential generate an electrospray plume of electrically charged analyte particles for analysis.

20 Claims, 11 Drawing Sheets

Related U.S. Application Data

(60) Provisional application No. 63/031,871, filed on May 29, 2020.

(58) Field of Classification Search
USPC .......................................... 250/281, 282, 288
See application file for complete search history.

(56) References Cited

U.S. PATENT DOCUMENTS

| | | | | |
|---|---|---|---|---|
| 2010/0155496 | A1* | 6/2010 | Stark | B05B 5/047 239/3 |
| 2011/0147576 | A1 | 6/2011 | Wouters et al. | |

* cited by examiner

| SETTING | GLUCOSE | LYSOZYME | PC 28:0 | PFOS |
|---|---|---|---|---|
| CAPILLARY (V) | -6000 | -6000 | -6000 | 6000 |
| ENDPOINT OFFSET (V) | -500 | -500 | -500 | -500 |
| SKIMMER 1(V) | 24.5 | 30 | 58 | -43.2 |
| SKIMMER 2 (V) | 6 | 6 | 6 | -0.6 |
| CAPILLARY EXIT OFFSET (V) | 20 | 60 | 30 | -77.1 |
| CAPILLARY EXIT (V) | 44.5 | 90 | 88 | -120.3 |
| OCTOPOLE 1 (V) | 2.32 | 3.15 | 2.86 | -2.62 |
| OCTOPOLE RF (Vpp) | 150 | 150 | 150 | 150 |
| OCTOPOLE Δ (V) | 2.4 | 2.4 | 2.4 | -2.4 |
| LENS 1 (V) | -5 | -5 | -5 | 5 |
| TRAP DRIVE | 40.1 | 101.1 | 68.4 | 55.6 |
| LENS 2 (V) | -60 | -60 | -60 | 60 |

FIG. 7

CONDENSED LIQUID AEROSOL PARTICLE SPRAY (CLAPS)—A NOVEL ON-LINE LIQUID AEROSOL SAMPLING AND IONIZATION TECHNIQUE

CROSS-REFERENCE TO RELATED APPLICATION

This application is a continuation of and claims priority to PCT/US2021/034915 filed May 28, 2021, which claims priority to U.S. Provisional Patent Application Ser. No. 63/031,871, filed May 29, 2020, the entire contents of which are incorporated by reference herein.

FIELD OF INVENTION

The subject matter disclosed herein relates to the generation of ionized molecules from aerosol particles for on-line capture and analysis of the same.

BACKGROUND

Ambient ionization refers to a family of ionization techniques in mass spectrometry in which ionization occurs at atmospheric pressure prior to introduction of the ions into the vacuum region of the mass spectrometer. Benefits of ambient ionization include minimal or no sample preparation and the ability to analyze samples from their native state in real-time. Ambient ionization can be broadly classified into laser-based techniques, atmospheric pressure chemical ionization (APCI)-related techniques, and spray-based techniques.

One example application for ambient ionization is the characterization of aerosols, defined as solid or liquid particles in the nanometer to micrometer range suspended in gas. Aerosols have a wide-reaching influence on human health and the environment, though their impacts may be difficult to quantify. Cloud formation is an example of a liquid aerosol particle growth process, and anthropogenic disturbances in the atmosphere can have unexpected effects on cloud behavior. Natural phenomena such as breaking ocean waves, and natural disasters, such as forest fires and volcanic eruptions, also release enormous numbers of aerosol particles of various sizes and compositions into the atmosphere. The acute and chronic effects of the release of such aerosolized particles are not yet fully understood. The effects of aerosols on human health is also an aspect of current research. The inhalation of very small (<2.5 μm diameter) aerosol particles, such as those found in smog or cigarette smoke, has been shown to lead to an increased incidence of a variety of conditions, including, for example, inflammation, reduced lung function, and cardiac problems, including heart failure.

Studying and understanding aerosol properties and composition is thus imperative for the implementation of informed environmental and public health policies, as well as in other disparate fields, such as secondary organic aerosol formation, drug delivery, biological warfare agent detection, and biomass burning. Typical compositional analysis includes offline aerosol collection onto a filter, sometimes referred to as filter capture, followed by solvent extraction and liquid or gas chromatography and mass spectrometric analysis (LC- or GC-MS) of the resultant liquid extract. Because filter capture is off-line, such analyses commonly suffer from detrimental effects such as analyte aging or oxidation during sample preparation. Aerosols may also undergo other undesirable reactions including irreversible binding to the capture filter or bias during solvent extraction. Thus, the suite of compounds identified in an offline analysis of a complex sample may not accurately represent the compounds present in the aerosol particles just after generation.

Several types of ambient ionization have been used in the analysis of aerosol particles. Desorption electrospray ionization (DESI) has been used by impacting an aerosol onto a plate prior to surface analysis. A particle-into-liquid sampler (PILS) has also been used to sample aerosols resulting from biomass burning prior to electrospray ionization. Both of these techniques, however, are off-line and require sample collection and/or preparation prior to analysis, meaning there may still be a significant delay between particle capture and sample analysis and are therefore susceptible to chemical aging and evaporative losses. Real-time ambient ionization has also been applied to aerosol particles. Low temperature plasma ionization (LTPI) has been used to characterize organic aerosols in which the plasma from a dielectric barrier discharge intersects a stream of organic aerosol particles. An ambient electrospray ionization (AESI) source has also been used where the aerosol was flowed through the nebulization gas inlet of a conventional electrospray source. The most reported technique for the online characterization of aerosol particles is extractive electrospray ionization (EESI). EESI is a technique in which a nebulized sample is passed through an electrospray plume near the atmospheric pressure inlet of a mass spectrometer. EESI is likely to be the most broadly applicable ambient ionization technique for the ionization of organic aerosols because of the ability to use different solvents to enhance the ionization of different classes of molecules. Compounds in the nebulized sample are typically ionized as $[M+H]^+$ or $[M-H]^-$, although it has been shown that adding a metal salt to the electrospray solvent can improve sensitivity for some compounds by metal cationization.

One major challenge associated with EESI of aerosol particles is the difficulty in aligning the aerosol stream and electrospray plume in the source region. The nebulized solvent spray must intersect an aerosol-gas stream which is invisible to the eye at typical aerosol concentrations. Small differences in the position of either the ESI emitter or aerosol stream can lead to large differences in the sampling efficiency and electric field, resulting in a loss in sensitivity. There is also variation in signal as a function of time that results in large coefficients of variations in the analysis, unrelated to fluctuations in the aerosol.

Many aerosols, particularly radical-containing atmospheric aerosols, are highly dynamic and reactive. It is therefore most analytically relevant to analyze particles as rapidly and as close to their native state as possible, creating a pressing need for the further development of effective on-line sampling methods.

The difficulty of interfacing a fast and sensitive analytical technique, such as mass spectrometry, to on-line aerosol analysis lies in rapidly extracting, vaporizing, and ionizing analytes directly from such aerosols. An example of an on-line aerosol analysis technique is the Aerodyne aerosol mass spectrometer (AMS). In this instrument, aerosols are pulsed onto a high-temperature surface, vaporizing them, followed by electron ionization of the ablated analyte molecules and subsequent mass analysis. However, AMS is not compatible with thermally labile analytes and performs poorly with compositionally complex aerosols, as electron ionization causes extensive fragmentation which can lead to extremely complex mass spectra and convoluted data analysis. Other on-line techniques such as open-port sampling interface (OPSI) ESI, EESI, and low-temperature plasma ionization (LTPI) have been explored as aerosol sampling techniques. However, it has been discovered that OPSI ESI can suffer from poor sensitivity due to analyte dilution and EESI is prone to effects such as incomplete extraction during gas-phase solvent-aerosol interaction. While these examples do not represent an exhaustive list of all on-line sampling and ionization techniques, the need for more effective sampling techniques persists.

SUMMARY

In an example embodiment, a system for ionizing one or more analytes in a sample is provided, the system comprising: an atomizer configured to generate aerosol particles containing the one or more analytes contained in the sample; and an emitter comprising an inner capillary and an outer capillary, the outer capillary being arranged about the inner capillary and forming an orifice of the emitter at a terminal end of the emitter; wherein the outer capillary is configured to receive the aerosol particles from the atomizer within a space defined between the inner capillary and the outer capillary of the emitter; wherein the outer capillary is configured such that the aerosol particles condense against an inner surface of the outer capillary and/or an outer surface of the inner capillary to form a condensate liquid sample, which flows towards a terminal end of the outer capillary to form a reservoir of the condensate liquid sample at the orifice of the emitter, between a terminal end of the inner capillary and the orifice of the emitter; wherein the emitter is configured to receive within the inner capillary a nebulizing gas, which flows towards the terminal end of the inner capillary; wherein an electrical potential is applied between the emitter and an inlet of a sample analyzer; and wherein the system is configured, using the nebulizing gas, a pressure at which the aerosol particles are supplied to the space between the inner capillary and the outer capillary, and the electrical potential, to generate an electrospray plume of electrically charged analyte particles.

In some embodiments, the system comprises an impactor having an impactor plate, wherein the sample is a liquid sample, wherein the impactor is configured such that the liquid sample is drawn, via an aerosolizing gas introduced into the impactor, from a sample source containing the liquid sample and sprayed within the atomizer against the impactor plate to aerosolize the liquid sample and form the aerosol particles generated by the atomizer.

In some embodiments of the system, the impactor plate has a cutoff diameter, such that particles of the liquid sample sprayed against the impactor plate that have a size greater than the cutoff diameter contact and condense against the impactor and flow back into the sample source via a return, wherein particles of the liquid sample sprayed against the impactor plate that have a size that is the same or smaller than the cutoff diameter of the impactor plate are emitted from the atomizer as the aerosol particles.

In some embodiments, the system comprises electrically conductive tubing connected between the atomizer and the emitter for transporting the aerosol particles from the atomizer to the emitter, wherein the tubing is electrically grounded to prevent electrostatic aerosol deposition of the aerosol particles against an inner surface of the tubing from occurring within the tubing prior to the aerosol particles being introduced into the emitter.

In some embodiments of the system, the tubing is configured to provide a pre-condensing effect to the aerosol particles passing therethrough, such that evaporation of liquid from the aerosol particles during transport through the tubing increases a concentration of the one or more analytes within each such aerosol particle.

In some embodiments of the system, the system is configured for operation in a negative ion mode, in which the electrically charged analyte particles have a negative electric charge.

In some embodiments of the system, the system is configured for operation in a positive ion mode, in which the electrically charged analyte particles have a positive electric charge.

In some embodiments of the system, the terminal end of the inner capillary is recessed within the emitter, relative to the terminal end of the outer capillary, and does not extend beyond the orifice of the emitter.

In some embodiments of the system, the emitter is configured for operation without receiving a solvent material.

In some embodiments of the system, the emitter is configured to receive only the nebulizing gas and the aerosol particles.

In some embodiments of the system, the sample analyzer comprises a mass spectrometer.

In some embodiments of the system, the outer capillary is arranged concentrically about the inner capillary, so that the inner and outer capillaries are substantially coaxial with each other.

In another example embodiment, a method of ionizing one or more analytes in a sample is provided, the method comprising: providing the sample comprising the one or more analytes; generating, using an atomizer, aerosol particles containing the one or more analytes contained in the sample; connecting an emitter to the atomizer, wherein the emitter comprises an inner capillary and an outer capillary, wherein the outer capillary is arranged about the inner capillary and at least partially forms an orifice of the emitter at a terminal end of the emitter; transporting the aerosol particles from the atomizer to a space defined between the inner capillary and the outer capillary of the emitter; condensing the aerosol particles against an inner surface of the outer capillary and/or an outer surface of the inner capillary to form a condensate liquid sample, which flows towards a terminal end of the outer capillary to form a reservoir of the condensate liquid sample at the orifice of the emitter, between a terminal end of the inner capillary and the orifice of the emitter; connecting the inner capillary to a source of a nebulizing gas; flowing the nebulizing gas through the inner capillary, towards the terminal end of the inner capillary; applying an electrical potential between the emitter and an inlet of a sample analyzer; and flowing the nebulizing gas through the reservoir of the condensate liquid sample to generate an electrospray plume of electrically charged analyte particles.

In some embodiments, the sample is a liquid sample and the method comprises: providing an impactor having an impactor plate; introducing an aerosolizing gas into the impactor to draw the sample from a sample source containing the liquid sample; and spraying the liquid sample within the atomizer, against the impactor plate, to aerosolize the liquid sample and form the aerosol particles generated by the atomizer.

In some embodiments of the method, the impactor plate has a cutoff diameter, such that particles of the liquid sample sprayed against the impactor plate that have a size greater than the cutoff diameter contact and condense against the impactor and flow back into the sample source via a return, wherein particles of the liquid sample sprayed against the impactor plate that have a size that is the same or smaller than the cutoff diameter of the impactor plate are emitted from the atomizer as the aerosol particles.

In some embodiments, the emitter is connected to the atomizer with electrically conductive tubing, the method comprising: transporting the aerosol particles from the atomizer to the emitter via the tubing; and electrically grounding the tubing to prevent electrostatic aerosol deposition of the aerosol particles against an inner surface of the tubing from occurring within the tubing prior to the aerosol particles being introduced into the emitter.

In some embodiments, the method comprises evaporating a portion of some or all liquid from the aerosol particles during transport through the tubing to increase a concentration of the one or more analytes within each such aerosol particle.

In some embodiments of the method, the electrically charged analyte particles have a negative electric charge.

In some embodiments of the method, the electrically charged analyte particles have a positive electric charge.

In some embodiments of the method, the terminal end of the inner capillary is recessed within the emitter, relative to the terminal end of the outer capillary, and does not extend beyond the orifice of the emitter.

In some embodiments of the method, the emitter is operable without receiving a solvent.

In some embodiments of the method, the emitter receives only the nebulizing gas and the aerosol particles.

In some embodiments of the method, the sample analyzer comprises a mass spectrometer.

In some embodiments of the method, the outer capillary is arranged concentrically about the inner capillary, so that the inner and outer capillaries are substantially coaxial with each other.

In another example embodiment, a system for ionizing one or more analytes in a sample is provided, the system comprising: an atomizer configured to generate aerosol particles containing the one or more analytes contained in the sample; and an emitter comprising an inner capillary and an outer capillary, the outer capillary being arranged about the inner capillary and forming an orifice of the emitter at a terminal end of the emitter; wherein the inner capillary is configured to receive the aerosol particles from the atomizer; wherein the inner capillary is configured such that the aerosol particles condense against an inner surface of the inner capillary to form a condensate liquid sample, which flows towards a terminal end of the inner capillary to form a reservoir of the condensate liquid sample at the orifice of the emitter; wherein the emitter is configured to receive, within a space defined between the inner capillary and the outer capillary, a nebulizing gas which flows towards a terminal end of the outer capillary; wherein an electrical potential is applied between the emitter and an inlet of a sample analyzer; and wherein the system is configured, using the nebulizing gas, a pressure at which the aerosol particles are supplied to the inner capillary, and the electrical potential, to generate an electrospray plume of electrically charged analyte particles.

In some embodiments, the system comprises an impactor having an impactor plate, wherein the sample is a liquid sample, wherein the impactor is configured such that the liquid sample is drawn, via an aerosolizing gas introduced into the impactor, from a sample source containing the liquid sample and sprayed within the atomizer against the impactor plate to aerosolize the liquid sample and form the aerosol particles generated by the atomizer.

In some embodiments of the system, the impactor plate has a cutoff diameter, such that particles of the liquid sample sprayed against the impactor plate that have a size greater than the cutoff diameter contact and condense against the impactor and flow back into the sample source via a return, wherein particles of the liquid sample sprayed against the impactor plate that have a size that is the same or smaller than the cutoff diameter of the impactor plate are emitted from the atomizer as the aerosol particles.

In some embodiments, the system comprises electrically conductive tubing connected between the atomizer and the emitter for transporting the aerosol particles from the atomizer to the emitter, wherein the tubing is electrically grounded to prevent electrostatic aerosol deposition of the aerosol particles against an inner surface of the tubing from occurring within the tubing prior to the aerosol particles being introduced into the emitter.

In some embodiments of the system, the tubing is configured to provide a pre-condensing effect to the aerosol particles passing therethrough, such that evaporation of liquid from the aerosol particles during transport through the tubing increases a concentration of the one or more analytes within each such aerosol particle.

In some embodiments of the system, the system is configured for operation in a negative ion mode, in which the electrically charged analyte particles have a negative electric charge.

In some embodiments of the system, the system is configured for operation in a positive ion mode, in which the electrically charged analyte particles have a positive electric charge.

In some embodiments of the system, the terminal end of the inner capillary is recessed within the emitter, relative to the terminal end of the outer capillary, and does not extend beyond the orifice of the emitter.

In some embodiments of the system, the emitter is configured for operation without receiving a solvent.

In some embodiments of the system, the emitter is configured to receive only the nebulizing gas and the aerosol particles.

In some embodiments of the system, the sample analyzer comprises a mass spectrometer.

In some embodiments of the system, the outer capillary is arranged concentrically about the inner capillary, so that the inner and outer capillaries are substantially coaxial with each other.

In still another example embodiment, a method of ionizing one or more analytes in a sample is provided, the method comprising: providing the sample comprising the one or more analytes; generating, using an atomizer, aerosol particles containing the one or more analytes contained in the sample; connecting an emitter to the atomizer, wherein the emitter comprises an inner capillary and an outer capillary, wherein the outer capillary is arranged about the inner capillary and at least partially forms an orifice of the emitter at a terminal end of the emitter; transporting the aerosol particles from the atomizer to the inner capillary of the emitter; condensing the aerosol particles against an inner surface of the inner capillary to form a condensate liquid sample, which flows towards a terminal end of the inner capillary to form a reservoir of the condensate liquid sample at the orifice of the emitter; connecting the outer capillary to a source of a nebulizing gas, such that the nebulizing gas is introduced within a space defined between the inner capillary and the outer capillary; flowing the nebulizing gas through the space between the inner capillary and the outer capillary of the emitter, towards a terminal end of the outer capillary; applying an electrical potential between the emitter and an inlet of a sample analyzer; and flowing the nebulizing gas through the reservoir of the condensate liquid sample to generate an electrospray plume of electrically charged analyte particles.

In some embodiments, the sample is a liquid sample and the method comprises: providing an impactor having an impactor plate; introducing an aerosolizing gas into the impactor to draw the sample from a sample source containing the liquid sample; and spraying the liquid sample within the atomizer, against the impactor plate, to aerosolize the liquid sample and form the aerosol particles generated by the atomizer.

In some embodiments of the method, the impactor plate has a cutoff diameter, such that particles of the liquid sample sprayed against the impactor plate that have a size greater than the cutoff diameter contact and condense against the impactor and flow back into the sample source via a return, wherein particles of the liquid sample sprayed against the impactor plate that have a size that is the same or smaller than the cutoff diameter of the impactor plate are emitted from the atomizer as the aerosol particles.

In some embodiments, the emitter is connected to the atomizer with electrically conductive tubing, the method comprising: transporting the aerosol particles from the atomizer to the emitter via the tubing; and electrically grounding the tubing to prevent electrostatic aerosol deposition of the aerosol particles against an inner surface of the tubing from occurring within the tubing prior to the aerosol particles being introduced into the emitter.

In some embodiments, the method comprises evaporating a portion of some or all liquid from the aerosol particles during transport through the tubing to increase a concentration of the one or more analytes within each such aerosol particle.

In some embodiments of the method, the electrically charged analyte particles have a negative electric charge.

In some embodiments of the method, the electrically charged analyte particles have a positive electric charge.

In some embodiments of the method, the terminal end of the inner capillary is recessed within the emitter, relative to the terminal end of the outer capillary, and does not extend beyond the orifice of the emitter.

In some embodiments of the method, the emitter is operable without receiving a solvent.

In some embodiments of the method, the emitter receives only the nebulizing gas and the aerosol particles.

In some embodiments of the method, the sample analyzer comprises a mass spectrometer.

In some embodiments of the method, the outer capillary is arranged concentrically about the inner capillary, so that the inner and outer capillaries are substantially coaxial with each other.

BRIEF DESCRIPTION OF THE DRAWINGS

For a more complete understanding of the present disclosure and the advantages thereof, reference is now made to the following brief description, taken in connection with the accompanying drawings and detailed description.

FIG. 7 is a table of example mass spectrometer optics settings used for generating the graphical plots of FIGS. 3A-4C and 6A-6F, for both the CLAPS technique and the ESI technique.

DETAILED DESCRIPTION

The on-line (e.g., real-time) capture and analysis of aerosol particles is important for the study of human epidemiology and environmental health. The subject matter disclosed herein includes a novel technique, termed condensed liquid aerosol particle spray (CLAPS) which can be coupled to mass spectrometry or any other technique to analyze gaseous ions, which is compatible with analytes in liquid matrices. Empirical data is presented herein to demonstrate the effectiveness of the CLAPS technique for analyzing aerosols nebulized from samples of a variety of species including small molecules, lipids, per- and polyfluoroalkyl substances (PFAS), and proteins in solution. Particle sizes of relevant aerosolized standards have also been evaluated using a differential mobility analyzer coupled to a condensation particle counter (DMA-CPC) to allow for inferences to be made about particle dynamics while utilizing the CLAPS technique. Lastly, as the ultimate goal of aerosol analysis is the on-line and quantitative analysis of analytes in aerosols, it will be shown that the linear dynamic range of CLAPS evidences a high degree of linearity and a lower limit of detection compared to electrospray ionization (ESI).

According to the novel on-line aerosol sampling method, in the CLAPS technique, liquid particles are impacted (e.g., upon a surface) and condense into an emitter comprising or consisting of concentric capillaries, which respectively deliver aerosol and nebulizing gas streams coaxially. The nebulizing gas ($N_2$) is delivered to a second capillary of the emitter. Condensed aerosol is then directly electrosprayed from the emitter by applying a voltage difference between the tip of the emitter and the inlet of the mass spectrometer. This technique avoids dilution of the aerosol sample, as well as any potentially problematic or analyte-biasing gas-phase mixing phenomena. The CLAPS technique avoids exposing analytes to extreme temperatures and, as a "soft" ionization technique, causes minimal undesirable fragmentation of the analytes, making the CLAPS technique suitable for analyzing large molecules and mixtures using mass spectrometry. The remainder of the instant disclosure will show advantages achieved by the use of the CLAPS technique coupled to a mass spectrometer as an analytical technique for a range of different analytes, as well as the ability to use the CLAPS technique for on-line, quantitative analysis of real samples.

Figure 1:
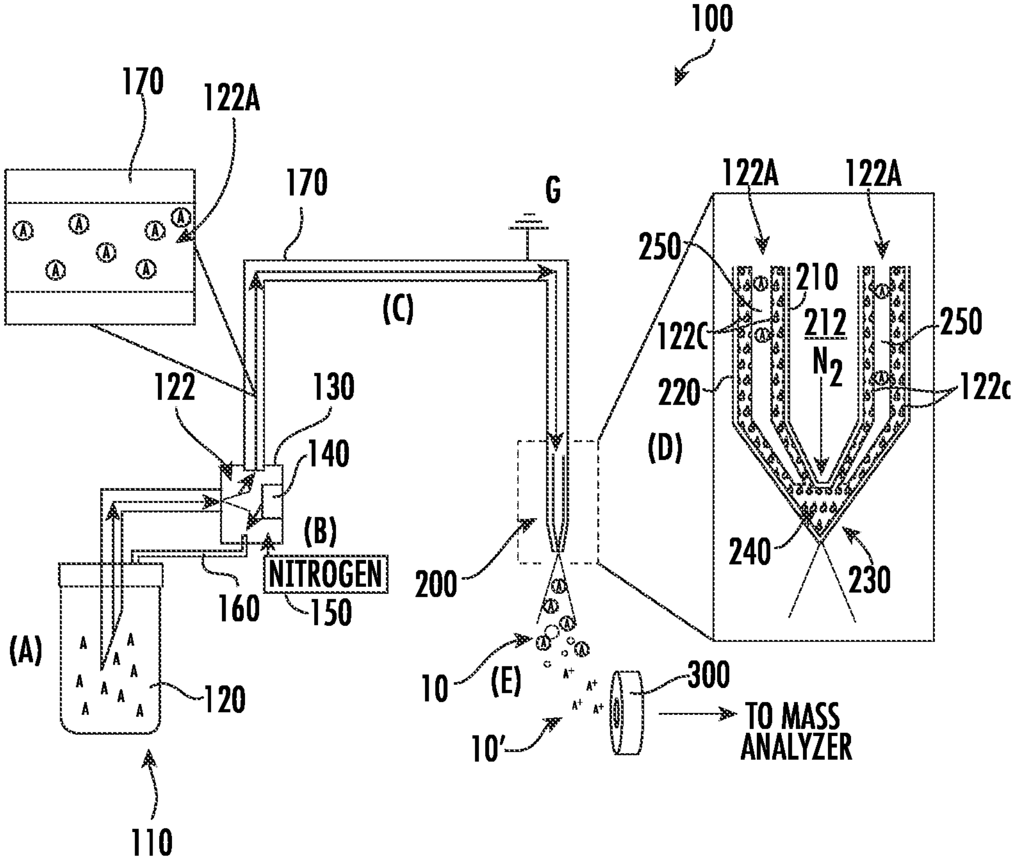
FIG. 1 is a schematic illustration of an example embodiment of a system for the generation and sampling of aerosols for induction into, for example, a mass spectrometer.

In FIG. 1, an example embodiment of a system, generally designated 100, for performing the condensed liquid aerosol particle spray (CLAPS) technique for induction of aerosol analytes into a sample analyzer (e.g., a mass spectrometer) is shown. The system 100 comprises an atomizer, in which liquid sample 120 is drawn out of (e.g., using suction) a sample source or container, generally designated 110, and into a constant output atomizer (COA) 130 via an aerosolizing gas (e.g., nitrogen, or $N_2$) from an aerosolizing gas source 150. Within the COA 130, a spray pattern 122 of the liquid sample 120 is generated by spraying the liquid sample 120 through a small orifice within the COA 130. The spray pattern 122 is impinged against an impactor plate 140. The impactor plate 140 has a desired cutoff diameter (e.g., 1 micrometer (μm)), such that sample particles within the spray pattern 122 that have a size (e.g., diameter) greater than the cutoff diameter (referred to hereinafter as "oversized sample particles") of the impactor plate 140 will strike (e.g., come into direct contact with) a surface of the impactor plate 140. Upon striking the impactor plate 140, such oversized sample particles will condense on the impactor plate 140 and flow (e.g., as a liquid) through a return 160 (e.g., a pipe, tube, or other suitable conduit) back into the sample source or container 110. As such, it is possible to ensure that no amount of the sample material is wasted or discarded. Furthermore, it is possible to ensure that all of the sample particles that are generated for analysis by the COA 130 are of a predetermined maximum size (e.g., are smaller or the same size as the cutoff diameter of the impactor plate 140.)

In some embodiments, the sample source or container is omitted and aerosol particles can be injected from, for example, an ambient air source (e.g., from environmental air). Aerosol particles, generally designated 122A, having a size that is less than or equal to the cutoff diameter of the impactor plate 140 exit the COA 130 and are transferred to the emitter, generally designated 200, through electrically conductive tubing 170. The tubing 170 is advantageously electrically connected to a ground G (sometimes referred to as an "earth") so that the aerosol particles 122A being transported therethrough do not condense within the tubing 170 via electrostatic aerosol deposition before the aerosol particles 122A are received at the emitter 200.

The emitter 200 of the system 100 is a coaxial emitter. A coaxial emitter has two capillaries that are concentrically configured or arranged relative to each other. Thus, the emitter 200 has an inner capillary 210 and an outer capillary 220. The inner capillary 210 is surrounded by the outer capillary 220. The inner capillary 210 and the outer capillary 220 can have a same cross-sectional shape or a different cross-sectional profile as each other. In the example embodiment disclosed herein, both the inner capillary 210 and the outer capillary 220 have a circular, or annular, cross-sectional profile, or shape. The inner and/or outer capillaries 210, 220 can have cross-sectional profiles of any suitable irregular or polygonal shape. The cross-sectional profile of one or both of the inner capillary 210 and the outer capillary 220 can vary e.g., increase and/or decrease in size) along the length (e.g., in the direction of extension) of the emitter 200. As shown in the example embodiment of the system 100, both the inner capillary 210 and the outer capillary 220 have a tapered shape (e.g., decrease in cross-sectional shape) at, or adjacent to, the orifice, generally designated 230, of the emitter 200. In the example embodiment illustrated in FIG. 1, the outer capillary 220 has an outer diameter of about 3.9 mm and an inner diameter of about 2 mm and the inner capillary 210 has an outer diameter of about 0.9 mm and an inner diameter of about 0.81 mm, such that a space, generally designated 250, is defined between the outer capillary and the inner capillary is about 0.55 mm, when the inner capillary 210 is centered concentrically within (e.g., so as to be coaxial with) the outer capillary 220. These dimensions are merely examples and the respective inner and/or outer diameters of the inner and/or outer capillaries 210, 220 of such a system can be different from the range disclosed herein while still remaining within the scope of this disclosure. The disclosed dimensions are thought to be particularly advantageous, however, because the efficacy of the emitter 200 diminishes when constructed from inner and/or outer capillaries 210, 220 having significantly greater diameters than the example dimensions disclosed herein.

As shown in FIG. 1, the aerosol particles 122A are introduced (e.g., funneled, or otherwise segregated or aggregated) into the outer capillary 220, within the space 250 between the inner capillary 210 and the outer capillary 220. As noted elsewhere herein, the space 250 is a narrow space (e.g., having an distance of about 0.5 mm between an inner surface of the outer capillary 220 and the outer surface of the inner capillary 210, allowing for slight misalignments due to tolerances that may not have the inner and outer capillaries precisely aligned to be coaxial with each other). The space 250 is in a shape of a hollow cylinder in the example embodiment of the emitter 200 shown in FIG. 1. Once in the space 250 defined between the outer capillary 220 and the inner capillary 210, the aerosol particles 122A impact against, and condense on, the outer surface of the inner capillary 210 and the inner surface of the outer capillary 220, producing a condensate liquid sample 122C that will flow along (e.g., by dripping down, assisted by gravity) the outer surface of the inner capillary 210 and the inner surface of the outer capillary 220, towards (e.g., in the direction of) the orifice 230 of the emitter 240, thereby forming a small reservoir, generally designated 240, of the condensate liquid sample 122C immediately adjacent (e.g., so as to obstruct) the orifice 230. To ensure proper formation of the reservoir 240 at the orifice 230, it is advantageous for the direction of extension of the emitter 200 to be coaxial with, or substantially coaxial with (e.g., allowing for misalignments of up to 10°, 5°, or 1°), the direction of a gravity vector. Significant misalignments (e.g., of less than 90°, but preferably no greater than 45°) of the emitter 200 relative to the gravity vector are also possible, but the flow rate of the condensate liquid sample 122C and the formation of the reservoir 240 may be disadvantageously impacted.

The inner capillary 210 of the emitter 200 provides a flow of a nebulizing gas (e.g., Nitrogen, or $N_2$) that can be the same gas as, or a different gas from, the aerosolizing gas introduced into the COA 130 from the aerosolizing gas source 150 to generate the aerosol particles 122A. The aerosolizing and nebulizing gases can be any suitable gas and is not limited to only nitrogen. In some other example embodiments, the aerosol particles 122A are introduced (e.g., funneled, or otherwise segregated or aggregated) into the inner capillary 210 and the nebulizing gas is provided to, so as to flow through, the space 250 formed between the inner capillary 210 and the outer capillary 220.

The emitter 200 is designed such that the outer capillary 220 tapers (e.g., has a diameter that reduces along a portion of the length thereof, including a constant reduction in diameter as a function of position along the length over a portion thereof) towards the orifice 230 and extends longitudinally (e.g., in the direction of extension of the emitter 200) beyond the inner capillary 210, so that the reservoir 240 formed by the condensate liquid sample collected at or adjacent to the orifice 230 is formed at least between the terminal end of the inner capillary 210, adjacent to the orifice 230, and the terminal end of the outer capillary 220, which defines, via the shape of the tapered section thereof, the size and/or shape of the orifice 230 of the emitter 200. Thus, in the example embodiment shown, the terminal end (e.g., the end from which the nebulizing gas is emitted into the reservoir 240) of the inner capillary 210 is located in a first plane and the terminal end (e.g., the end towards which the condensate liquid sample 122C flows) of the outer capillary 220 is located in a second plane, the first plane and the second plane being spaced apart from each other. Due to the size of the orifice 230 and the viscosity and surface tension properties of the condensate liquid sample 122C, the reservoir 240 is formed within at least a portion of the space within the emitter 200 between the first plane and the second plane, so that the nebulizing gas must pass through the reservoir 240 of the condensate liquid sample 122C to exit the emitter 200. In some embodiments, one or both of the tips at the terminal end of the inner capillary 210 and/or the outer capillary 220 can be inclined relative to each other, the gravity vector, and/or the direction of extension of the emitter 200.

The reservoir 240 of condensate liquid sample 122C may extend internally within (e.g., away from the terminal end of) the outer capillary 220 beyond the terminal end of the inner capillary 210, however, the flow rate of the nebulizing gas through and from the inner capillary 210 is sufficient to prevent any of the condensate liquid sample 122C from being present within the inner capillary 210. Thus, the reservoir 240 of the condensate liquid sample 122C can extend, within the space 250 between the inner and outer capillaries 210, 220, from the second plane, in which the orifice 230 is located, up to and beyond the first plane, in which the terminal end of the inner capillary 210 is located, but no portion of the reservoir 240 of the condensate liquid sample 122C will be within the inner capillary 210 itself. As such, the nebulizing gas exits the inner capillary 210 at the terminal end thereof (e.g., at the first plane) and is impinged upon (e.g., incident upon, directly contacting, and/or directly through) the reservoir 240 of the condensate liquid sample 122C present at the orifice 230 of the emitter 200 to form the aerosol.

An electrical potential (e.g., a voltage typically between 2.5 and 6.5 kV) is applied between the inlet 300 of the sample analyzer (e.g., a mass spectrometer) and the emitter 200. Due to the flow rate and pressure of the nebulizing gas through and from the inner capillary 210, the pressure generated within the space 250 between the inner capillary 210 and the outer capillary 220 due to the flow of the aerosol particles 122A being introduced therein, and the electrical potential applied between the inlet 300 of the sample analyzer and the emitter 200, an electrospray plume, generally designated 10, containing electrically charged analyte particles is generated. This arrangement and functionality of the system 100 is advantageous because the electrospray plume 10 can be generated without the need for separately introducing a flow of a solvent material into the emitter 200.

Figure 2:
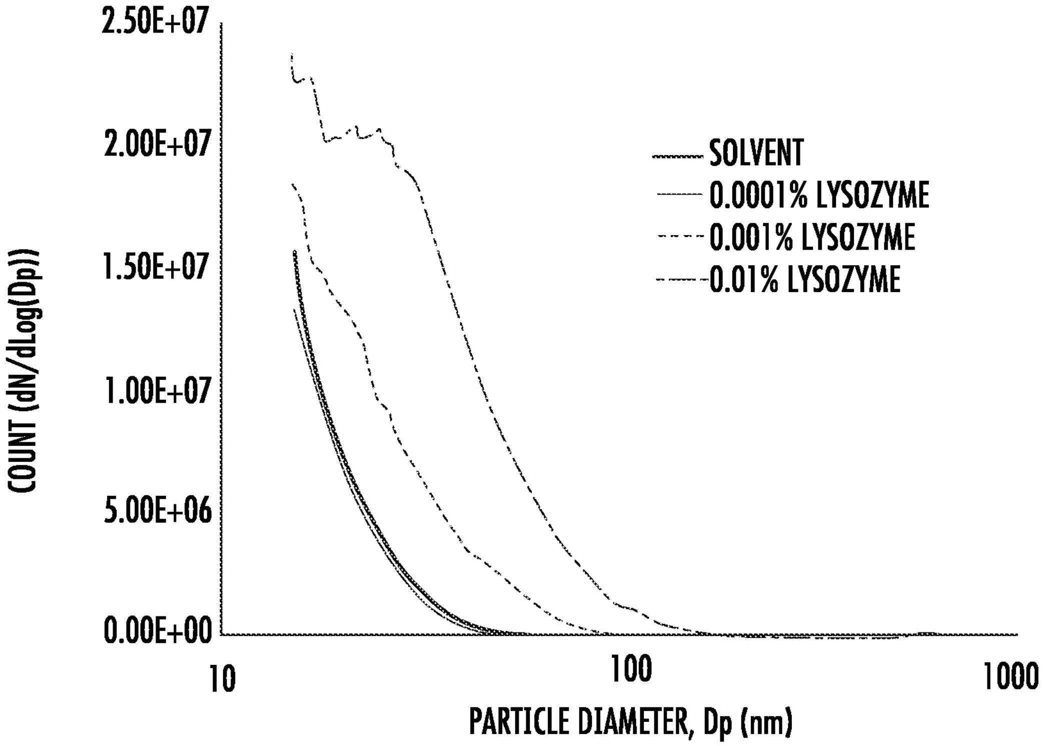
FIG. 2 is a graphical plot of aerosol count vs. Particle diameter for several lysozyme standard aerosols on a logarithmic scale.

To assess the efficacy of the mechanism of particle collection in the CLAPS technique, aerosol sizing experiments were performed on a series of lysozyme solutions of various concentrations in a 70:30 MeOH/water solution. The results of these experiments are shown in FIG. 2, in which increasing the concentration of lysozyme in the solution is shown to produce higher quantities, or concentrations, of aerosol particles with larger average diameters. The size of the aerosol particles observed for the four sets of example experimental data shown in FIG. 2 range from approximately 10 nanometers (nm) to 100 nm in diameter. The Stokes-Einstein equation can be used to estimate the diffusion coefficient and root mean square diffusion speed of 10 nm and 100 nm particles in air. Assuming standard particle density (e.g., 1 g/mL), it is estimated that particles would take about 18 seconds to three minutes to diffuse the radius of the CLAPS emitter (e.g., 0.5 mm in the example embodiment) at the high and low end of the range of particle diameters, respectively. As even the lowest diffusion time of 18 seconds greatly exceeds the amount of time, or duration, that the aerosol particles are actually present in the emitter after having been introduced into the space 25 between the inner capillary 210 and the outer capillary 220, the primary mechanism of aerosol droplet collection within the emitter when implementing the CLAPS technique is caused by impaction of the aerosol particles on interior surfaces of the space 250 within the emitter 200, due to the inherent turbulence induced from bulk gas flow of the aerosol particles 122A into and through the emitter 200.

Figure 6A:
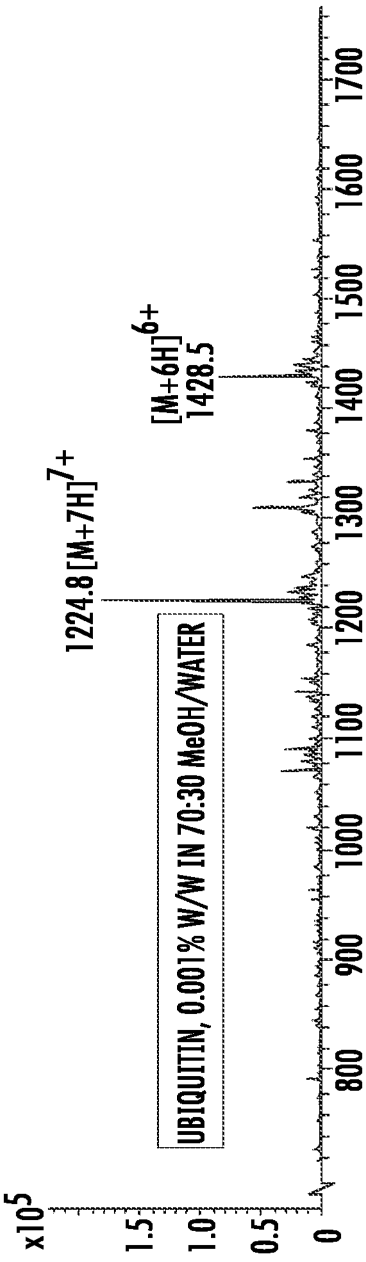
FIG. 6A is a graphical plot of a mass spectrum of ubiquitin at a 0.001% w/w concentration in a 70:30 MeOH/water solution produced using the CLAPS technique.
Figure 6B:
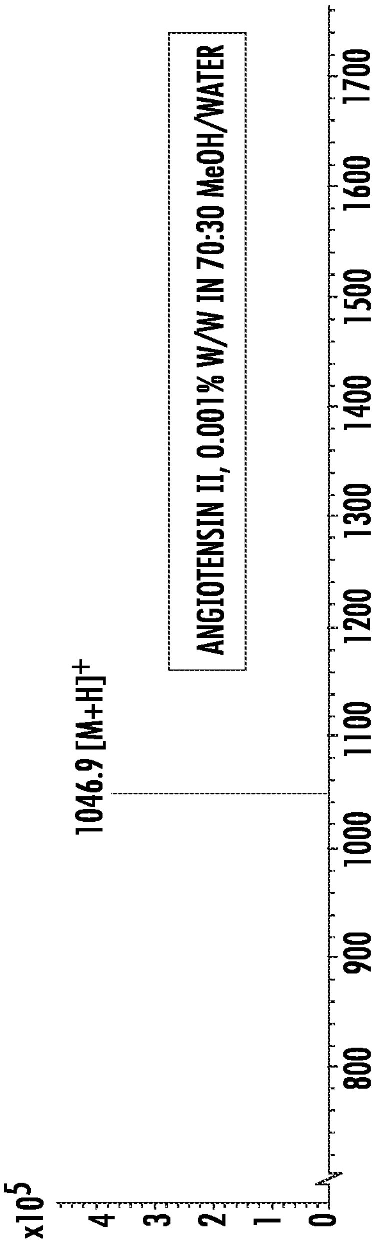
FIG. 6B is a graphical plot of a mass spectrum of angiotensin II at a 0.001% w/w concentration in a 70:30 MeOH/water solution produced using the CLAPS technique.

In order to evaluate the efficacy of the CLAPS technique against a known technique, for each experiment performed using the CLAPS technique, a parallel experiment was performed using the electrospray ionization (ESI) technique on the same sample to evaluate potential mechanistic and performance differences between the CLAPS and ESI techniques. For every molecule class tested, analyte intensity was found to be increased by a factor of between 2 to 20 or more, inclusive, with larger molecules showing greater increases, in experiments using the CLAPS technique than experiments performed using the ESI technique. The increase in analyte intensity was found to be most significant for proteins and peptides, including lysozyme (see FIGS. 3A and 3B), ubiquitin (see FIG. 6A), and angiotensin II (see FIG. 6B).

Figure 3A:
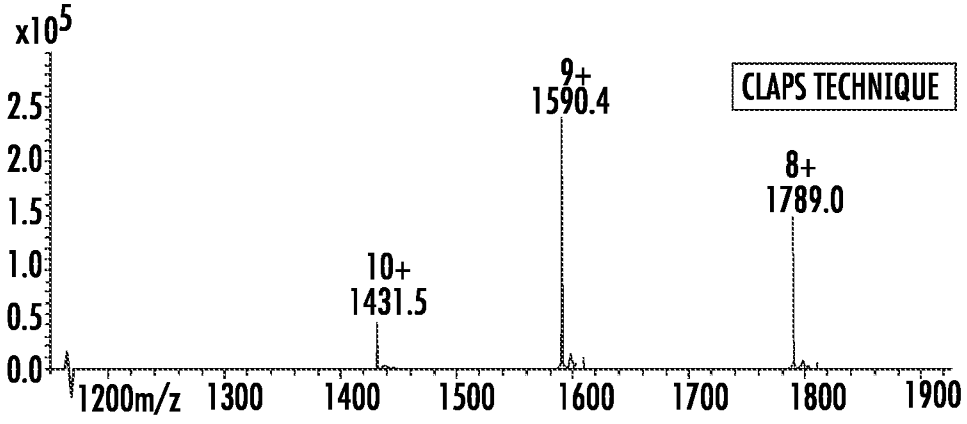
FIG. 3A is a graphical plot of a mass spectrum of 700 nM lysozyme in a 70:30 MeOH/Water solution using the CLAPS technique disclosed herein.
Figure 3B:
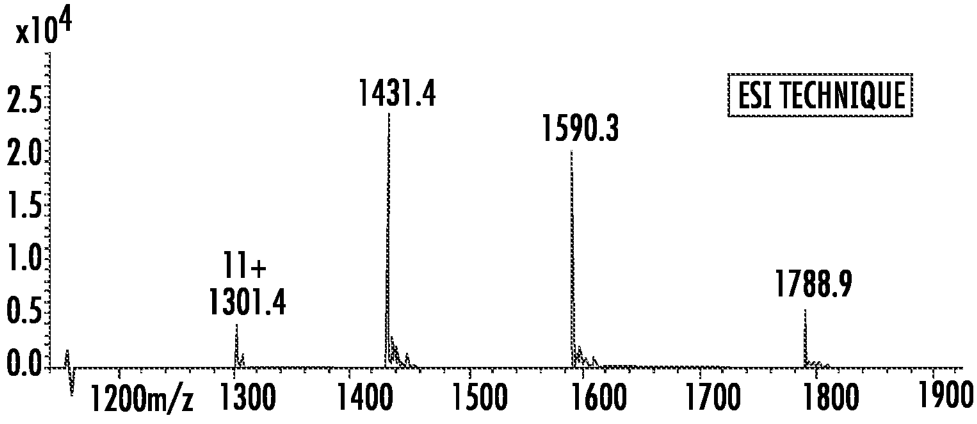
FIG. 3B is a graphical plot of a mass spectrum of 700 nM lysozyme in a 70:30 MeOH/Water solution using an electrospray ionization (ESI) technique.

As shown in FIGS. 3A and 3B, in which mass spectra for a 700 nM lysozyme concentration in a 70:30 MeOH/water solution are generated using the CLAPS technique and the ESI technique, respectively, there is an increase in ion intensity of approximately an order of magnitude (i.e., tenfold) when the mass spectrum generated using the CLAPS technique is compared against the mass spectrum generated using the ESI technique. The observed improvement in analyte ion intensity for a given analyte concentration when the CLAPS technique is used is typically between a multiple of 10-20× the analyte ion intensity observed using the ESI technique. This improvement in analyte ion intensity has been observed to be consistent for lysozyme across the concentration range tested, extending down to at least low nanomolar (e.g., 70 nM) concentrations. The increase in analyte ion intensity when the CLAPS technique is used over the ESI technique is believed to be due, at least in part, to droplets becoming enriched in the analyte en route to the emitter, as the droplets must travel through a length of tubing (e.g., 170, see FIG. 1, which is on the order of several feet in the experiments performed and described herein) between being generated in the COA 130 and being condensed in the emitter 200. Any evaporation that occurs while the aerosol particles 122A are traversing the length of the electrically grounded tube will have a pre-concentrating effect on the aerosol particles 122A, increasing the concentration of the analyte within each such droplet, or aerosol particle 122A.

Figure 4A:
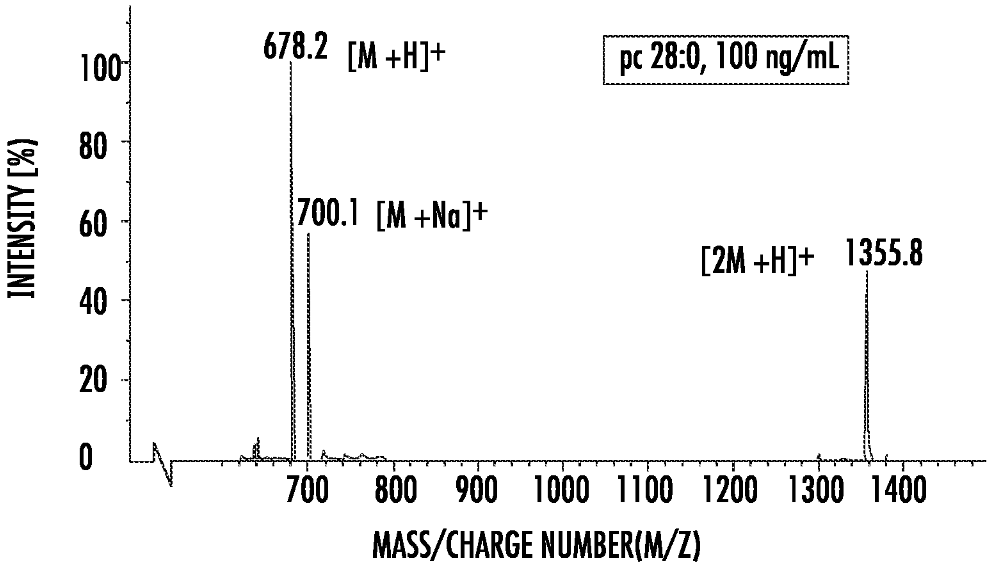
FIG. 4A is a graphical plot of a mass spectrum of a lipid (PC 28:0, 100 ng/mL concentration) using the CLAPS technique disclosed herein.
Figure 4B:
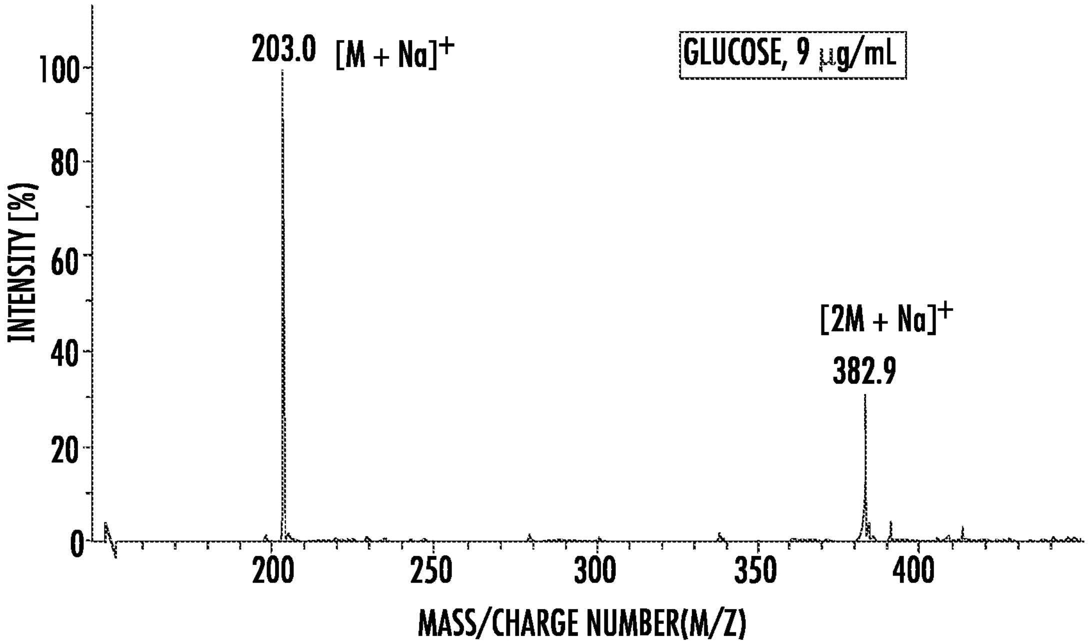
FIG. 4B is a graphical plot of a mass spectrum of a monosaccharide (glucose, 9 μg/mL concentration) using the CLAPS technique disclosed herein.
Figure 4C:
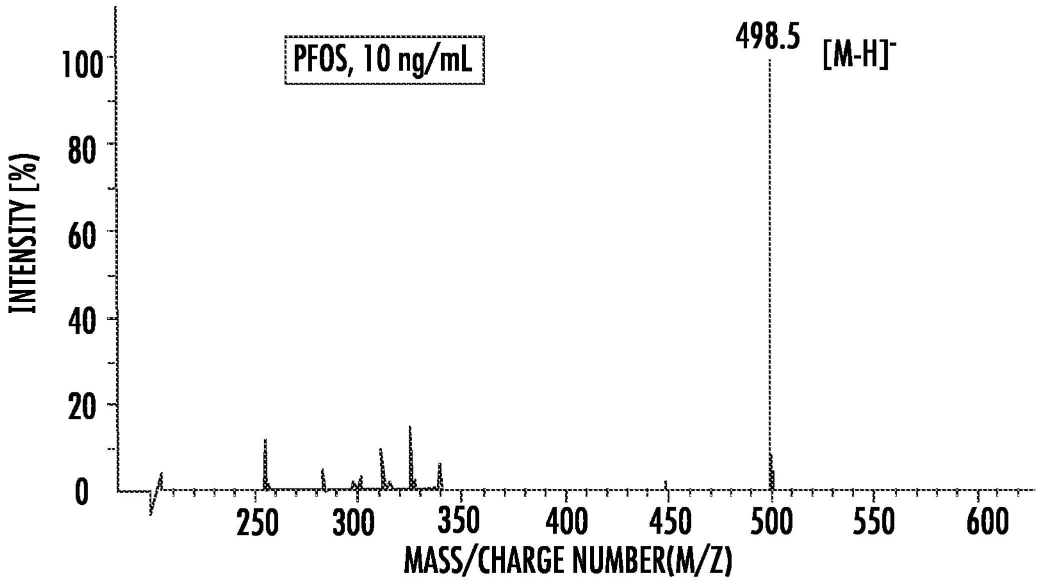
FIG. 4C is a graphical plot of a mass spectrum of perfluorooctanesulfonate (μFOS, 10 ng/mL concentration) using the CLAPS technique disclosed herein.
Figure 6C:
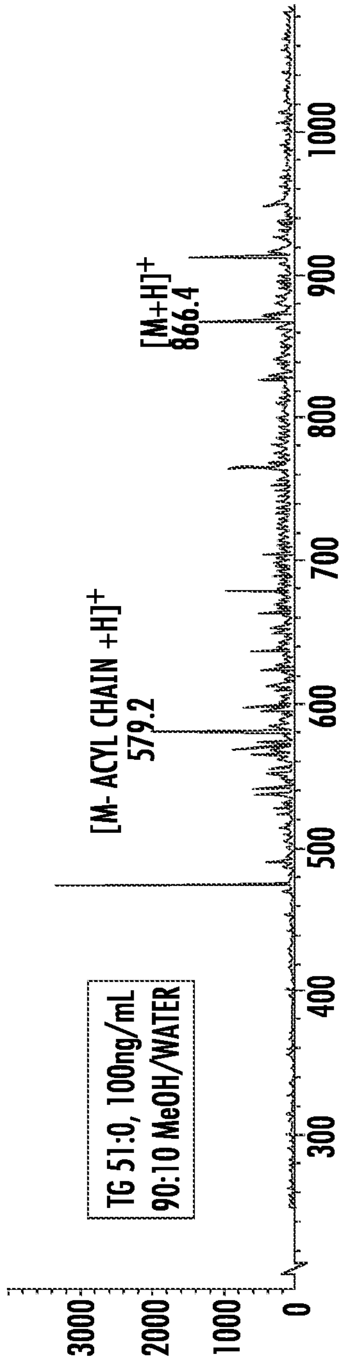
FIG. 6C is a graphical plot of a mass spectrum of a lipid (PE 32:0) at a 100 ng/mL concentration in a 90:10 MeOH/water solution produced using the CLAPS technique.
Figure 6D:
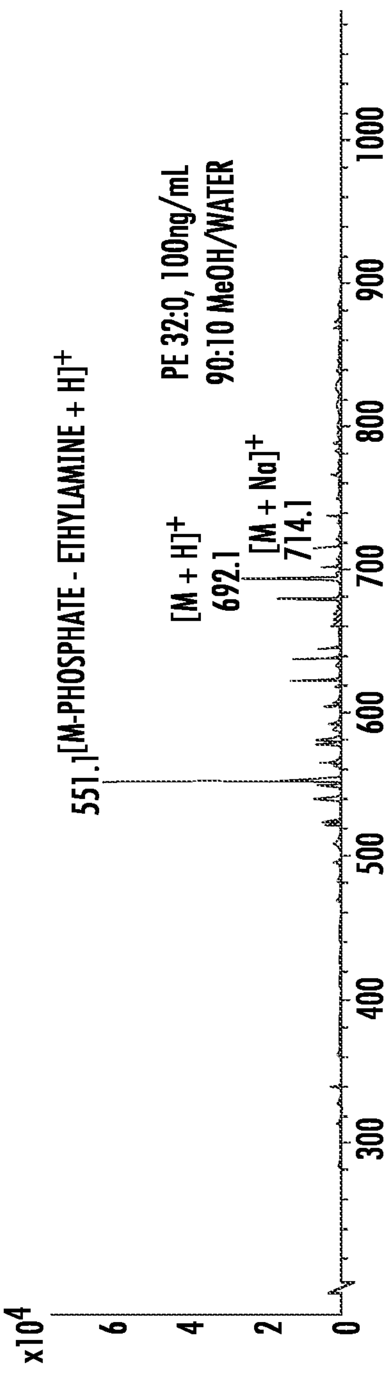
FIG. 6D is a graphical plot of a mass spectrum of a lipid (TG 51:0) at a 100 ng/mL concentration in a 90:10 MeOH/water solution produced using the CLAPS technique.
Figure 6E:
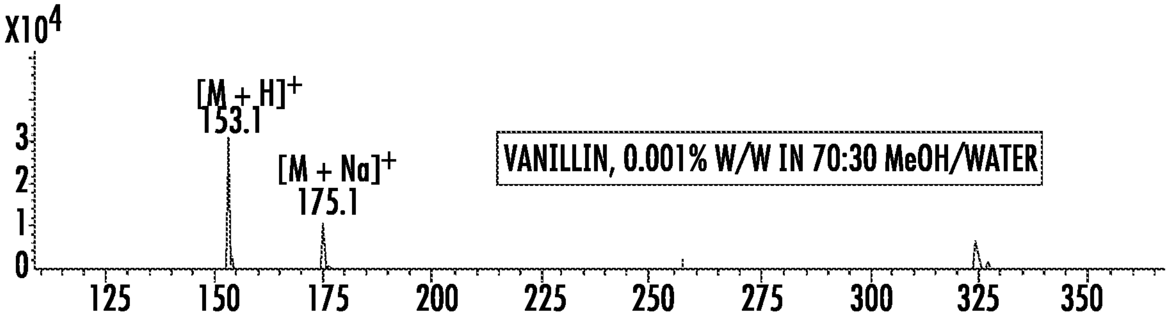
FIG. 6E is a graphical plot of a mass spectrum of vanillin at a 0.001% w/w concentration in a 90:10 MeOH/water solution produced using the CLAPS technique.
Figure 6F:
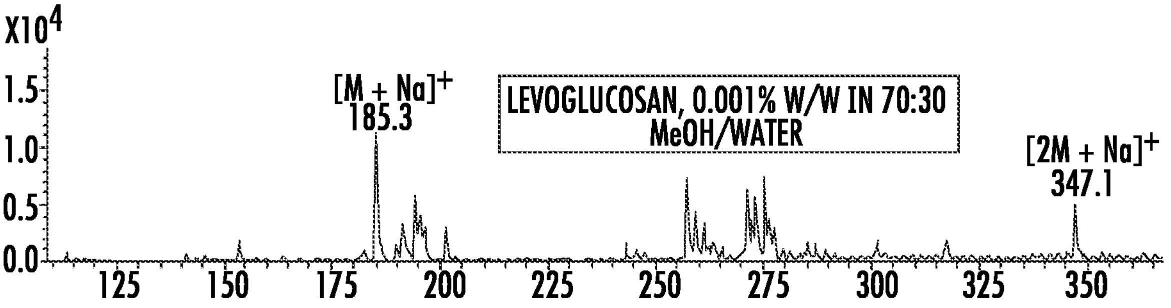
FIG. 6F is a graphical plot of a mass spectrum of levoglucosan at a 0.001% w/w concentration in a 90:10 MeOH/water solution produced using the CLAPS technique.

To assess the viability of using the CLAPS technique for the detection of diverse chemical species, as might be found in naturally-occurring aerosols, a variety of analyte classes were ionized and analyzed in a mass spectrometer using the CLAPS technique. Mass spectra of a lipid (PC 28:0), a monosaccharide (glucose), and perfluorooctanesulfonate (PFOS) are shown in FIGS. 4A-4C, respectively. Mass spectra were also obtained using the CLAPS technique for other chemical species, including the lipids triglyceride (TG) 51:0 (FIG. 6C) and phosphoethanolamine (PE) 32:0 (FIG. 6D), vanillin (FIG. 6E), and levoglucosan (FIG. 6F). The analysis of PFOS (FIG. 4C) also demonstrates that the CLAPS technique is also suitable for use in a so-called "negative ion mode," as well as in the "positive ion mode" shown in FIG. 1. While the performance, as measured by the increase in ion intensity in the analyte aerosol, of the system 100 of FIG. 1 using CLAPS technique was shown to be a significant improvement over known ESI techniques across a plurality of chemical species, the improvement in performance was greatest for analytes of larger mass (e.g., molecular mass). However, mass spectra generated using the CLAPS technique have signal intensities and signal-to-noise ratios that are at least comparable to (e.g., the same as, or at least not worse than) or better than mass spectra generated using the ESI technique for each chemical species evaluated, regardless of the mass and/or size (e.g., diameter) of the analyte. The same ionic species were also observed to be generated in the electrospray plume 10 when using the CLAPS technique as is generated when using the ESI technique (e.g., analyte-preferred cation, dimerization, etc.).

However, relative intensities of ionic species were not necessarily conserved (e.g., were different) between experiments performed with the CLAPS and ESI techniques; specifically, dimer-to-monomer ratios tend to be higher when using the CLAPS technique than when using the ESI technique for, e.g., glucose. This difference in relative intensities of ionic species is thought to be predominantly caused by the pre-concentrating effect experienced by the aerosol particles 122A traversing the electrically grounded tubing 170, as was noted and discussed elsewhere herein, since dimers tend to form more readily in high-concentration solutions than do monomers. Differences in charge state distribution for lysozyme and ubiquitin using the CLAPS technique are also prevalent in comparison to those obtained using the ESI technique. This phenomenon can be observed in the mass spectra shown in FIGS. 3A and 3B, with ions generated using the CLAPS technique (FIG. 3A) having a different charge state from ions generated using the ESI technique (FIG. 3B).

Figure 5A:
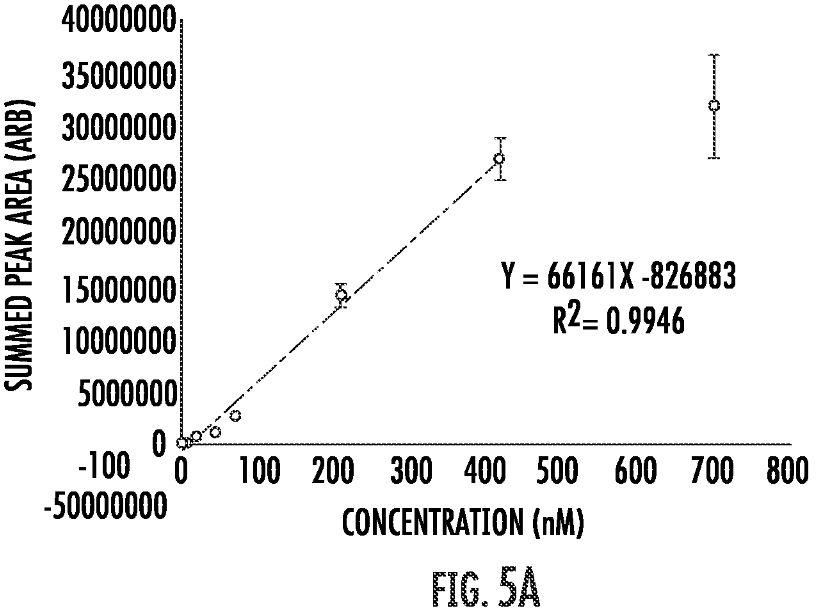
FIG. 5A is a calibration curve of lysozyme standards using the CLAPS technique disclosed herein.
Figure 5B:
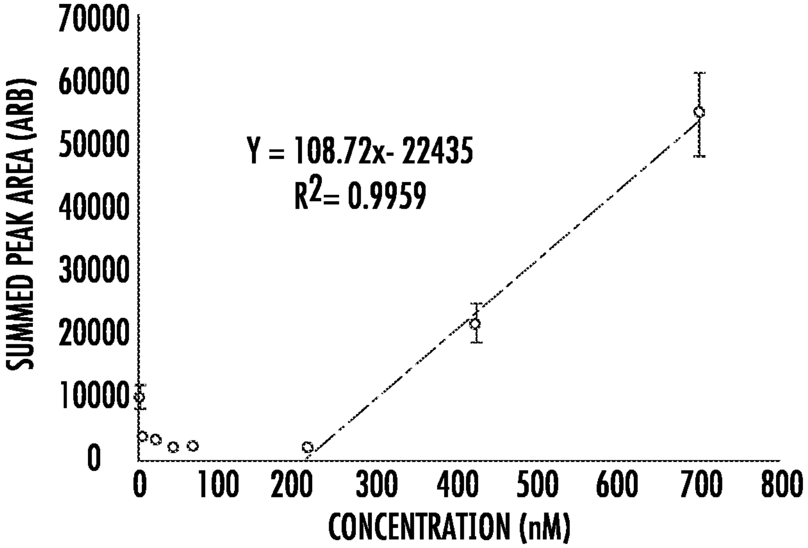
FIG. 5B is a calibration curve of lysozyme standards using an electrospray ionization (ESI) technique.

Since the ultimate goal of the analysis of naturally-occurring aerosols is quantifying the relative concentrations of analytes in aerosols, the linear dynamic range of a series of lysozyme standards was evaluated using both the CLAPS technique and the ESI technique. Calibration curves were generated by the summing of two minutes of extracted ion intensities of each protein charge state ion, the intensity of which was generated using mass spectrometer peak area across a ±0.5 Da window centered on the mass spectrometer peak centroid. The total peak areas used for calibration were calculated by summing the calculated peak areas for all observed protein charge state ions. The calibration curves generated for the CLAPS technique and the ESI technique are shown in FIGS. 5A and 5B, respectively. The calibration curve generated using the CLAPS technique shows a high degree of linearity (having an $R^2>0.99$) and high degree of precision in a concentration range from about 7 nM to about 420 nM, inclusive, with a limit of detection (LOD) of less than 10 nM concentration. When a calibration curve is generated for the same series of lysozyme standards using the ESI techniques, the calibration curve shows a LOD of about 200 nM, which is much higher than the LOD observed for the calibration curve using the CLAPS technique. Points on the calibration curve below about 200 nM in concentration can be shown by inspection to have no analyte response; nonzero peak areas plotted in the calibration curve shown in FIG. 5B are the result of signal noise and are not conclusively indicative of the presence of any analyte. Given that improvements to CLAPS collection efficiency and precision as well as to a system including a mass spectrometer and CLAPS device as a whole are possible, the observed results are promising for the use of the CLAPS technique as an analytical tool for the quantitative study of aerosols.

The CLAPS technique has been shown to be a highly sensitive ionization technique, which is suitable for use in ionizing a variety of chemical species from liquid aerosol particles and shows increased signal intensities and signal-to-noise ratios than does the ESI technique under the same experimental and/or operational conditions. The CLAPS technique can also be adapted for analysis of solid particles using liquid particle growth analogous to the mechanism employed by a condensation particle counter (CPC).

Other embodiments of the current invention will be apparent to those skilled in the art from a consideration of this specification or practice of the invention disclosed herein. Thus, the foregoing specification is considered as showing merely example embodiments of the current invention, with the true scope thereof being defined by the following claims.

The invention claimed is:

1. A system for ionizing one or more analytes in a sample, the system comprising:

an aerosol source configured to generate aerosol particles containing the one or more analytes contained in the sample; and an emitter comprising an inner capillary and an outer capillary, the outer capillary being arranged about the inner capillary and forming an orifice of the emitter at a terminal end of the emitter;

wherein the outer capillary is configured to receive the aerosol particles within a space defined between the inner capillary and the outer capillary of the emitter;

wherein the outer capillary is configured such that the aerosol particles condense against an inner surface of the outer capillary and/or an outer surface of the inner capillary to form a condensate liquid sample, which flows towards a terminal end of the outer capillary to form a reservoir of the condensate liquid sample at the orifice of the emitter, between a terminal end of the inner capillary and the orifice of the emitter;

wherein the emitter is configured to receive within the inner capillary a nebulizing gas, which flows towards the terminal end of the inner capillary;

wherein an electrical potential is applied between the emitter and an inlet of a sample analyzer; and wherein the system is configured to generate an electrospray plume of electrically charged analyte particles using the nebulizing gas, a pressure at which the aerosol particles are supplied to the space between the inner capillary and the outer capillary, and the electrical potential.

2. The system of claim 1, wherein:

the system is configured for operation in a negative ion mode, in which the electrically charged analyte particles have a negative electric charge; or the system is configured for operation in a positive ion mode, in which the electrically charged analyte particles have a positive electric charge.

3. The system of claim 1, wherein the terminal end of the inner capillary is recessed within the emitter, relative to the terminal end of the outer capillary, and does not extend beyond the orifice of the emitter.

4. The system of claim 1, wherein the emitter is configured to receive only the nebulizing gas and the aerosol particles.

5. The system of claim 1, wherein the sample analyzer comprises a mass spectrometer.

6. A method of ionizing one or more analytes in a sample, the method comprising:

providing the sample comprising the one or more analytes;

generating, from an aerosol source, aerosol particles containing the one or more analytes contained in the sample;

connecting an emitter to the aerosol source, wherein the emitter comprises an inner capillary and an outer capillary, wherein the outer capillary is arranged about the inner capillary and at least partially forms an orifice of the emitter at a terminal end of the emitter;

transporting the aerosol particles into a space defined between the inner capillary and the outer capillary of the emitter;

condensing the aerosol particles against an inner surface of the outer capillary and/or an outer surface of the inner capillary to form a condensate liquid sample, which flows towards a terminal end of the outer capillary to form a reservoir of the condensate liquid sample at the orifice of the emitter, between a terminal end of the inner capillary and the orifice of the emitter;

connecting the inner capillary to a source of a nebulizing gas;

flowing the nebulizing gas through the inner capillary, towards the terminal end of the inner capillary;

applying an electrical potential between the emitter and an inlet of a sample analyzer; and flowing the nebulizing gas through the reservoir of the condensate liquid sample to generate an electrospray plume of electrically charged analyte particles.

7. The method of claim 6, wherein:

the electrically charged analyte particles have a negative electric charge; or the electrically charged analyte particles have a positive electric charge.

8. The method of claim 6, wherein the terminal end of the inner capillary is recessed within the emitter, relative to the terminal end of the outer capillary, and does not extend beyond the orifice of the emitter.

9. The method of claim 6, wherein the emitter receives only the nebulizing gas and the aerosol particles.

10. The method of claim 6, wherein the sample analyzer comprises a mass spectrometer.

11. A system for ionizing one or more analytes in a sample, the system comprising:

an aerosol source configured to generate aerosol particles containing the one or more analytes contained in the sample; and an emitter comprising an inner capillary and an outer capillary, the outer capillary being arranged about the inner capillary and forming an orifice of the emitter at a terminal end of the emitter;

wherein the inner capillary is configured to receive the aerosol particles;

wherein the inner capillary is configured such that the aerosol particles condense against an inner surface of the inner capillary to form a condensate liquid sample, which flows towards a terminal end of the inner capillary to form a reservoir of the condensate liquid sample at the orifice of the emitter;

wherein the emitter is configured to receive, within a space defined between the inner capillary and the outer capillary, a nebulizing gas which flows towards a terminal end of the outer capillary;

wherein an electrical potential is applied between the emitter and an inlet of a sample analyzer; and wherein the system is configured to generate an electrospray plume of electrically charged analyte particles using the nebulizing gas, a pressure at which the aerosol particles are supplied to the inner capillary, and the electrical potential.

12. The system of claim 11, wherein:

the system is configured for operation in a negative ion mode, in which the electrically charged analyte particles have a negative electric charge; or the system is configured for operation in a positive ion mode, in which the electrically charged analyte particles have a positive electric charge.

13. The system of claim 11, wherein the terminal end of the inner capillary is recessed within the emitter, relative to the terminal end of the outer capillary, and does not extend beyond the orifice of the emitter.

14. The system of claim 11, wherein the emitter is configured to receive only the nebulizing gas and the aerosol particles.

15. The system of claim 11, wherein the sample analyzer comprises a mass spectrometer.

16. A method of ionizing one or more analytes in a sample, the method comprising:

providing the sample comprising the one or more analytes;

generating, from an aerosol source, aerosol particles containing the one or more analytes contained in the sample;

connecting an emitter to the aerosol source, wherein the emitter comprises an inner capillary and an outer capillary, wherein the outer capillary is arranged about the inner capillary and at least partially forms an orifice of the emitter at a terminal end of the emitter;

transporting the aerosol particles into the inner capillary of the emitter;

condensing the aerosol particles against an inner surface of the inner capillary to form a condensate liquid sample, which flows towards a terminal end of the inner capillary to form a reservoir of the condensate liquid sample at the orifice of the emitter;

connecting the outer capillary to a source of a nebulizing gas, such that the nebulizing gas is introduced within a space defined between the inner capillary and the outer capillary;

flowing the nebulizing gas through the space between the inner capillary and the outer capillary of the emitter, towards a terminal end of the outer capillary;

applying an electrical potential between the emitter and an inlet of a sample analyzer; and flowing the nebulizing gas through the reservoir of the condensate liquid sample to generate an electrospray plume of electrically charged analyte particles.

17. The method of claim 16, wherein;

the electrically charged analyte particles have a negative electric charge; or the electrically charged analyte particles have a positive electric charge.

18. The method of claim 16, wherein the terminal end of the inner capillary is recessed within the emitter, relative to the terminal end of the outer capillary, and does not extend beyond the orifice of the emitter.

19. The method of claim 16, wherein the emitter receives only the nebulizing gas and the aerosol particles.

20. The method of claim 16, wherein the sample analyzer comprises a mass spectrometer.

* * * * *